(12) United States Patent
Peng et al.

(10) Patent No.: US 10,323,861 B2
(45) Date of Patent: *Jun. 18, 2019

(54) BUILDING ACCESSORY STRUCTURE

(71) Applicant: Hsiu-Lin Peng, Tainan (TW)

(72) Inventors: Hsiu-Lin Peng, Kaohsiung (TW); Yu-Yao Chen, Tainan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,012

(22) Filed: Sep. 5, 2017

(65) Prior Publication Data
US 2017/0363328 A1 Dec. 21, 2017

Related U.S. Application Data

(63) Continuation of application No. 14/846,823, filed on Sep. 6, 2015, now Pat. No. 9,816,728.

(30) Foreign Application Priority Data

Nov. 13, 2014 (CN) .......................... 2014 1 0647808

(51) Int. Cl.
F24S 70/30 (2018.01)
F24S 10/50 (2018.01)
F24S 20/63 (2018.01)
F24S 20/62 (2018.01)
F24S 20/67 (2018.01)
(Continued)

(52) U.S. Cl.
CPC ............... *F24S 20/63* (2018.05); *F24S 10/40* (2018.05); *F24S 10/50* (2018.05); *F24S 10/502* (2018.05); *F24S 10/503* (2018.05); *F24S 10/504* (2018.05); *F24S 10/505* (2018.05); *F24S 20/62* (2018.05); *F24S 20/66* (2018.05); *F24S 20/67* (2018.05); *F24S 70/25* (2018.05); *F24S 70/30* (2018.05); *F24S 80/30* (2018.05); *F24S 80/60* (2018.05); *F24S 80/65* (2018.05); *F24S 10/70* (2018.05); *F24S 2025/6007* (2018.05); *Y02B 10/20* (2013.01); *Y02B 10/22* (2013.01); *Y02E 10/44* (2013.01)

(58) Field of Classification Search
CPC ..................... F24J 2/04; F24J 2/05; F24J 2/20
USPC ......................................... 126/652, 663, 704
See application file for complete search history.

(56) References Cited

U.S. PATENT DOCUMENTS 4,090,494 A * 5/1978 Borst ...................... F24S 10/80
126/667
4,120,287 A * 10/1978 Marles .................. F24S 10/753
126/658

(Continued)

*Primary Examiner* — Gregory L Huson
*Assistant Examiner* — Nikhil P Mashruwala
(74) *Attorney, Agent, or Firm* — JCIPRNET

(57) ABSTRACT

A solar thermal collector and an accessory structure of a building are provided. The solar thermal collector includes at least one heat absorbing plate and at least one heat insulating plate. Each of the heat absorbing plate includes at least one first slab and first engaging parts connected with the first slab. Each of the heat insulating plate includes at least one second slab and second engaging parts connected with the second slab. The first engaging parts are respectively engaged with the second engaging parts, and a gap is maintained between the first slab and the second slab to define a heat collecting channel, through which a heat transfer medium flows between the heat absorbing plate and the heat insulating plate. A heat conductivity of the heat absorbing plate is at least 30 times greater than a heat conductivity of the heat insulating plate.

15 Claims, 13 Drawing Sheets

(51) Int. Cl.
    *F24S 10/40*     (2018.01)
    *F24S 80/30*     (2018.01)
    *F24S 80/60*     (2018.01)
    *F24S 80/65*     (2018.01)
    *F24S 70/25*     (2018.01)
    *F24S 20/66*     (2018.01)
    *F24S 10/70*     (2018.01)
    *F24S 25/60*     (2018.01)

(56) References Cited

U.S. PATENT DOCUMENTS

| | | | | |
|---|---|---|---|---|
| 4,220,137 A * | 9/1980 | Tesch | ............... | F24S 20/63 |
| | | | | 126/702 |
| 8,450,603 B2 * | 5/2013 | Tadayon | ............ | H02S 20/30 |
| | | | | 126/573 |
| 2008/0257335 A1 * | 10/2008 | Lowstuter | ............ | F24J 2/14 |
| | | | | 126/605 |

* cited by examiner

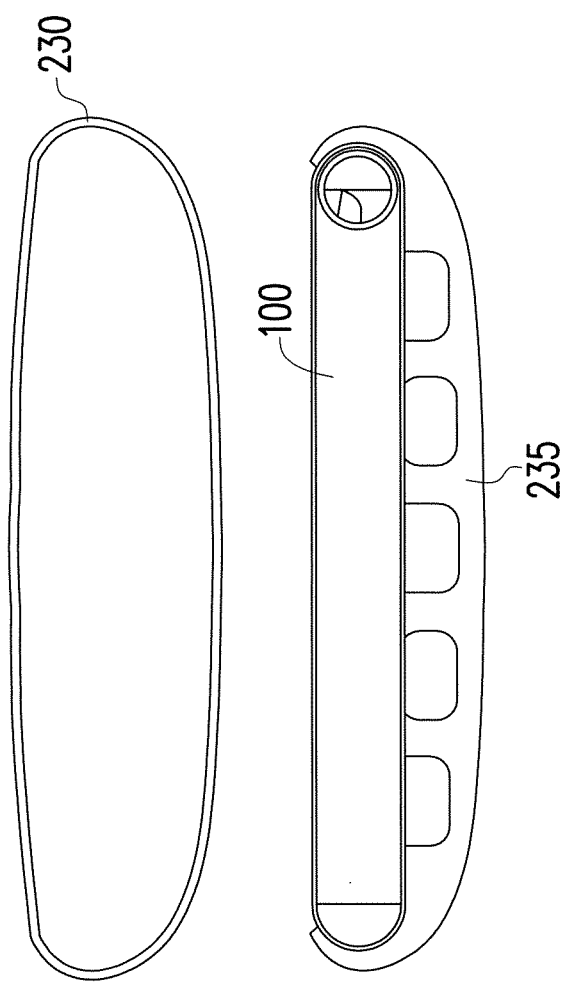

BUILDING ACCESSORY STRUCTURE

CROSS-REFERENCE TO RELATED APPLICATION

This application is a continuation application of and claims the priority benefit of U.S. patent application Ser. No. 14/846,823, filed on Sep. 6, 2015, now pending, which claims the priority benefit of China patent application serial no. 201410647808.9, filed on Nov. 13, 2014. The entirety of each of the above-mentioned patent applications is hereby incorporated by reference herein and made a part of this specification.

BACKGROUND OF THE INVENTION

Field of the Invention

The invention relates to a building-integrated energy collector and an accessory structure of a building. Specifically, the invention relates to a building-integrated solar thermal collector and a building accessory structure using the solar thermal collector.

Description of Related Art

With the rising awareness of environmental conservation, the public is paying more attention to the concepts of energy saving and reducing carbon emissions. The technologies of utilizing renewable energy have gained worldwide attention. In terms of renewable energy, solar energy is widely available. Unlike other energy sources, such as fossil energy or nuclear energy, solar energy does not cause carbon emissions or radiative pollution. Therefore, solar thermal collectors that convert sunlight into thermal energy have been applied in many fields and the production of solar thermal collectors has become an important industry.

A solar thermal collector with a large solar-receiving area can generate a relatively large amount of thermal energy for use. Many manufacturers in this field are putting efforts into integrating the concept of "green building" with the solar thermal collector, that is, to install solar thermal collectors on parts of a building that receive the most sunlight, so as to use the thermal energy generated by the solar thermal collectors to compensate for the thermal energy consumed in the building (e.g., supply of hot water or heating). However, the structures of current solar thermal collectors usually are not rigid and the installation requires attaching the collectors to existing building exterior structures, rather than become part of the building exterior structure. In addition, the bulky size and thickness of current solar thermal collectors limits the applicability and design flexibility of the solar thermal collector in the field of building integrated solar thermal (BIST).

SUMMARY OF THE INVENTION

The disclosure provides a solar thermal collector and a building accessory structure. When compared with conventional solar thermal collectors, the provided solar thermal collector has more rigid structure and better design flexibility. It also has less overall thickness and thus less wind resistance. As a result, the provided solar thermal collector is advantageous to be applied to a building as an accessory structure of the building.

The solar thermal collector of the disclosure includes at least one heat absorbing plate and at least one heat insulating plate. Each of the heat absorbing plates includes at least one first slab and a plurality of first engaging parts connected with the first slab. Each of the heat insulating plate includes at least one second slab and a plurality of second engaging parts connected with the second slab. The first engaging parts are respectively engaged with the second engaging parts, and a gap is maintained between the first slab and the second slab to form a heat collecting channel, through which a heat transfer medium can flow between the heat absorbing plate and the heat insulating plate. A heat conductivity of the heat absorbing plate is at least 30 times greater than a heat conductivity of the heat insulating plate.

In an embodiment of the invention, the solar thermal collector further includes a plurality of connecting pipes, which are connected to the edges of the heat collecting channels.

In an embodiment of the invention, the connecting pipe further includes a plurality of openings to allow the heat transfer medium to flow in and out of the heat collecting channels through the connecting pipe.

In an embodiment of the invention, each of the second engaging parts includes an extending groove and a hook groove, while each of the first engaging parts includes an extending section and a hook section. Each extending section is engaged with the corresponding extending groove, and each hook section is engaged with the corresponding hook groove in order to attach the heat absorbing plate to the heat insulating plate.

In an embodiment of the invention, the hood groove further includes a filler to be filled in the hook groove where the hook section is engaged.

In an embodiment of the invention, the filler includes a wedge, a curable adhesive, or a sealant.

In an embodiment of the invention, each of the first slabs and each of the second slabs are curved slabs, and each of the first slabs and the corresponding second slab are curved in the same direction.

In an embodiment of the invention, the solar thermal collector further includes a solar selective absorption coating that covers a solar-receiving surface of the heat absorbing plate.

The building accessory structure of the disclosure includes at least one frame and the frame connects to a plurality of the solar thermal collectors mentioned above. The proposed building accessory structure is suitable to be applied to an external area of a building. The frame is configured to hold the solar thermal collectors and the collectors are placed in parallel to each other in the frame.

In an embodiment of the invention, the frame includes at least one light-transmissive front cover placed on the side facing the heat absorbing plates. The frame also includes at least one light-transmissive back cover placed on the side facing the heat insulating plates.

In another embodiment of the invention, the frame includes at least one light-transmissive sleeve tube to hold the solar thermal collector. In addition, the light-transmissive sleeve is formed in one piece.

In an embodiment of the invention, the light-transmissive sleeve tube is made of non-glass materials.

In an embodiment of the invention, the light-transmissive sleeve tube is made of plastic materials.

In an embodiment of the invention, the external area includes a balcony or a terrace of the building.

In an embodiment of the invention, the building accessory structure is adapted to be a railing or barrier to be applied to the balcony or the terrace.

In an embodiment of the invention, the external area includes a rooftop, a window, a patio, or an open space adjacent to the building.

In an embodiment of the invention, the building accessory structure is adapted to be a shading structure or a covering structure to be applied to, the rooftop, the window, the patio, or the open space adjacent to the building.

Based on the above, the provided solar thermal collector allows the heat transfer medium to directly contact and flow through the heat absorbing plate, which means the solar thermal collector of the disclosure has a much larger heat exchange area than conventional collectors. Moreover, in the provided solar thermal collector, the heat conductivity of the heat absorbing plate is more than 30 times greater than the heat conductivity of the heat insulating plate. With such configuration, the thermal energy of sunlight can be efficiently transferred to the heat transfer medium through a large contact area of the heat absorbing plate, which has high heat conductivity. Meanwhile, the heat insulating plate providing favorable thermal insulation can effectively reduce heat loss of the provided solar thermal collector. In addition, the heat insulating plate of the disclosure is made of composite material that is light in weight, strong in structural strength and low in heat loss rate. Therefore, the thickness of the solar thermal collector profile and the collector frame can be effectively reduced without sacrificing the structural strength and the thermal insulation performance. Furthermore, due to the reduction of the solar thermal collector's overall thickness, the wind resistance is lowered to improve the applicability and design flexibility when the solar thermal collector is integrated with the building.

In addition, different from conventional collectors that can only be installed on rooftops, the solar thermal collector of the disclosure can be framed as building accessory structures that can be applied to building external areas, such as a balcony, window, or patio, to serve as railings, louvers, or patio shade structures. Therefore, the design flexibility can significantly improve the applicability when the solar thermal collector is integrated with the building.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 8A to FIG. 8C are schematic exploded views and assembled view of a light-transmissive sleeve tube and a solar thermal collector according to an embodiment of the invention.

DESCRIPTION OF THE EMBODIMENTS

Figure 1:
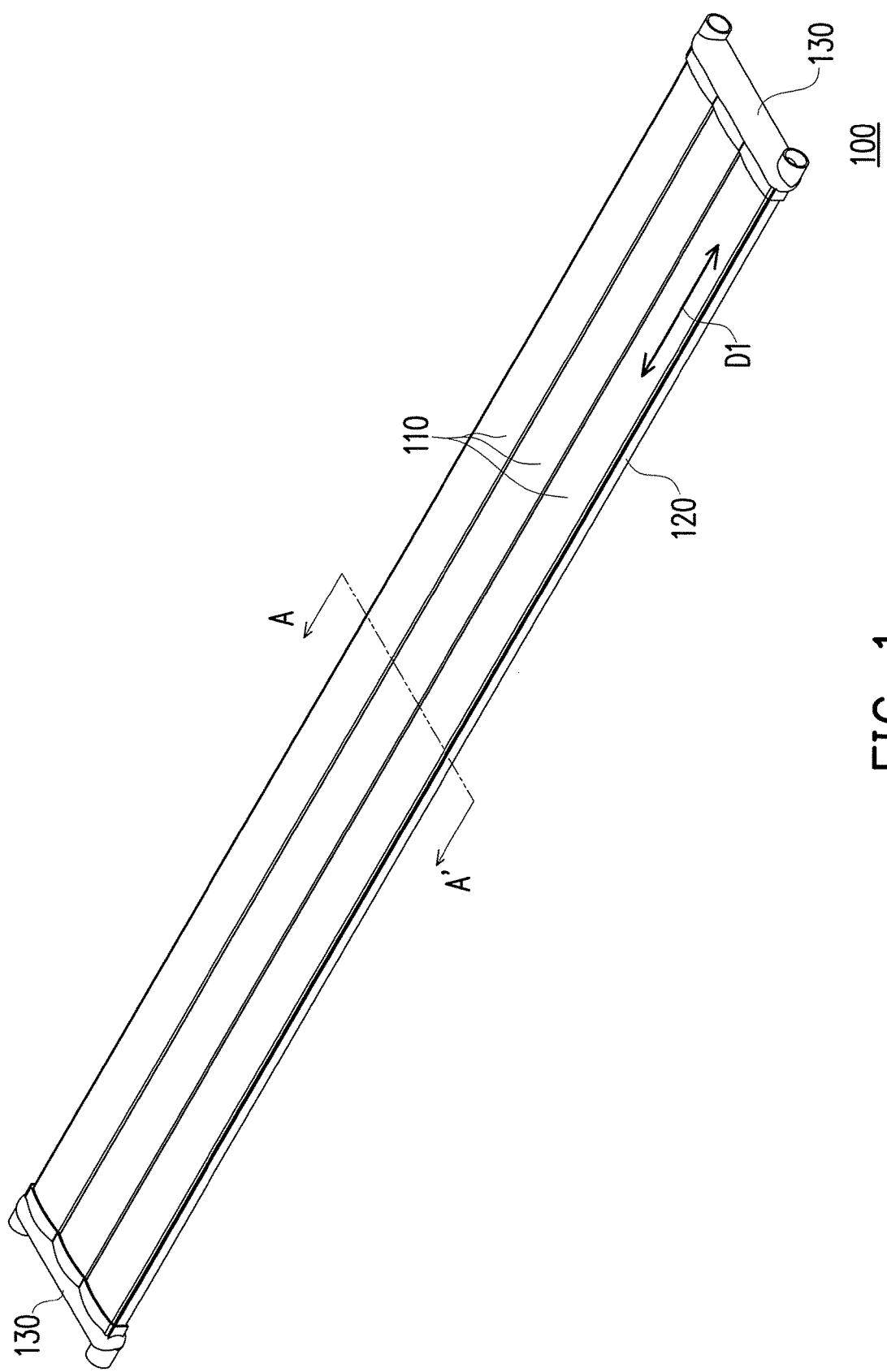
FIG. 1 is a schematic view of a solar thermal collector according to an embodiment of the invention.

It is to be understood that the foregoing and other technical contents, features, and advantages are intended to be described more comprehensively by providing embodiments accompanied with figures hereinafter. In the following embodiments, wording used to indicate directions, such as "up," "down," "front," "back," "left," and "right," merely refers to directions in the accompanying figures. Therefore, the directional wording is used to illustrate rather than limit the invention. Moreover, the same or similar reference numerals represent the same or similar elements in the following embodiments.

Figure 2:
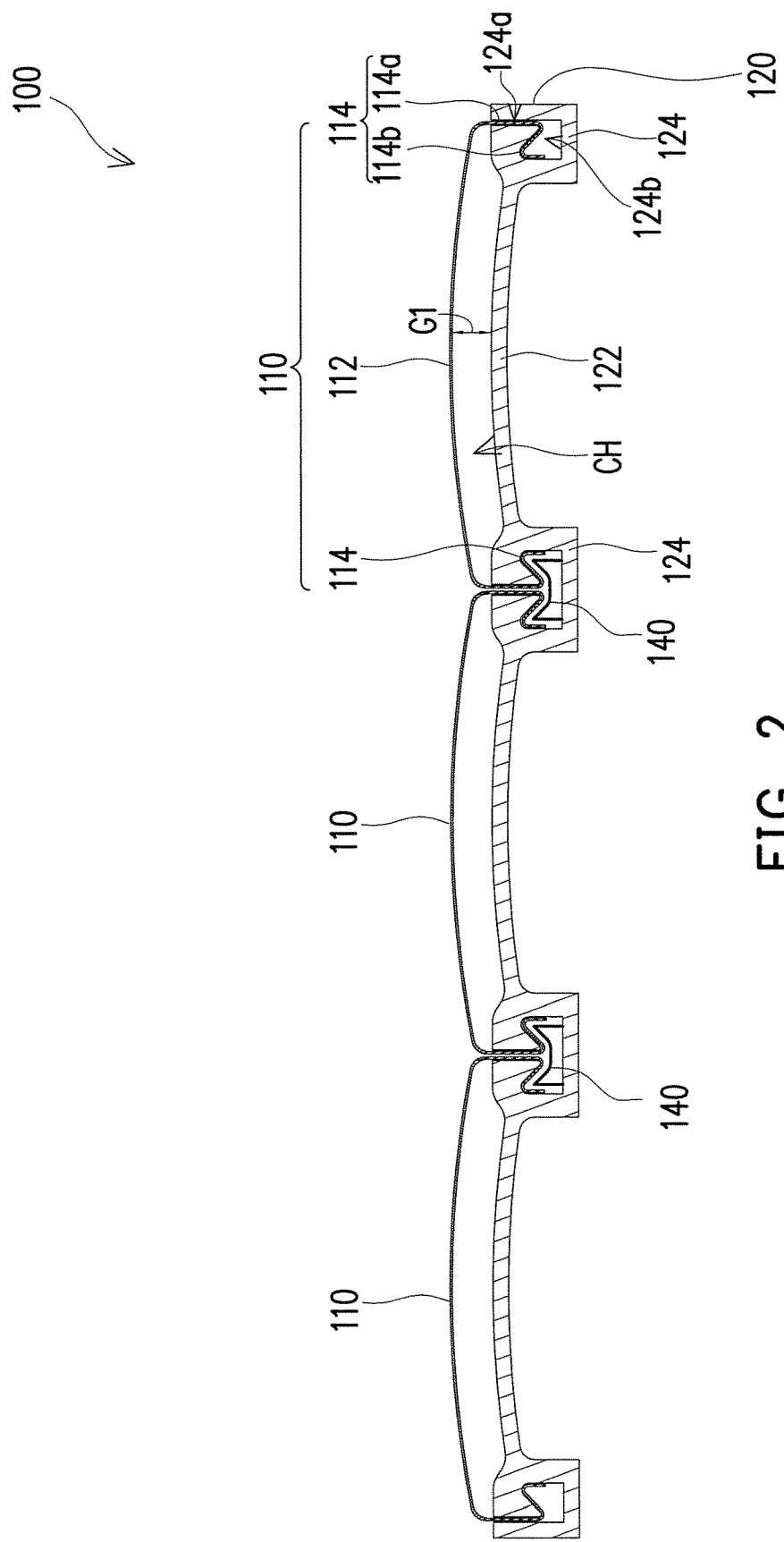
FIG. 2 is a schematic cross-sectional view of the solar thermal collector of FIG. 1 along the line A-A'.

FIG. 1 is a schematic view of a solar thermal collector according to an embodiment of the invention. FIG. 2 is a schematic cross-sectional view of the solar thermal collector of FIG. 1 along the line A-A'. With reference to FIG. 1 and FIG. 2, in this embodiment, a solar thermal collector 100 includes at least one heat absorbing plate 110 and at least one heat insulating plate 120. The heat absorbing plate 110 includes at least one first slab 112 and a plurality of first engaging parts 114 connected with the first slab 112. The heat insulating plate 120 includes at least one second slab 122 and a plurality of second engaging parts 124 connected with the second slab 122. The first engaging parts 114 are respectively engaged with the second engaging parts 124, and a gap G1 is maintained between the first slab 112 and the second slab 122 to define a heat collecting channel CH, through which a heat transfer medium flows in a longitudinal direction D1 of the first slab 112.

In this embodiment, a heat conductivity of the heat absorbing plate 110 is substantially 30 times or more greater than a heat conductivity of the heat insulating plate 120. More specifically, both the heat absorbing plate 110 and the heat insulating plate 120 may be formed integrally. The heat absorbing plate 110 may be formed integrally by stamping or rolling process, for example. A material of the heat absorbing plate 110 may be stainless steel and the heat conductivity of the heat absorbing plate 110 is about 12-30 W/(m° C). A material of the heat insulating plate 120 may be a composite material, such as fiber reinforced plastics (FRP), and the heat conductivity of the heat insulating plate 120 may be about 0.23-0.35 W/(m° C.). The fiber reinforced plastics include thermosetting resin or thermoplastic resin, and glass fiber or carbon fiber, for example. More specifically, the fiber reinforced plastics are composite materials mainly formed by mixing thermosetting resin or thermoplastic resin with glass fiber or carbon fiber, and function as reinforced concrete. Generally speaking, the fiber reinforced plastics have great strength per unit weight. That is, the fiber reinforced plastics have the characteristics of light in weight, high in structural strength, and very low in heat loss rate, so as to achieve favorable thermal insulation. For these reasons, the size and thickness of the heat insulating plate 120 using the said material are reduced significantly, and the structural strength and thermal insulation performance are enhanced.

In addition, the fiber reinforced plastics have corrosion resistance for various environments.

With such a configuration, the heat absorbing plate 110 and the heat insulating plate 120 of this embodiment together define the heat collecting channel CH, and the thermal energy of sunlight is efficiently transferred to the heat transfer medium in the heat collecting channel CH through the heat absorbing plate 110 with high heat conductivity, while the heat insulating plate 120 having favorable thermal insulation properties prevents loss of the thermal energy. Thus, the solar thermal collector 100 of this embodiment has favorable solar energy collection efficiency and structural strength. What is more, the size and overall thickness thereof are reduced and the wind resistance is lowered to improve the applicability and design flexibility of the solar thermal collector 100 in building integration.

In this embodiment, the solar thermal collector 100 includes a plurality of heat absorbing plates 110 and one heat insulating plate 120, as shown in FIG. 2. The first engaging parts 114 are respectively disposed on two opposite ends of each heat absorbing plate 110, and the heat insulating plate 120 includes a plurality of second slabs 122, as shown in FIG. 2, respectively corresponding to the first slabs 112 of the heat absorbing plate 110. More specifically, any two adjacent second slabs 122 are connected with each other by the corresponding second engaging parts 124. The first engaging parts 114 of each heat absorbing plate 110 are respectively engaged with the corresponding second engaging parts 124, so as to fix the heat absorbing plates 110 side by side onto the heat insulating plate 120 and form a plurality of independent passages.

To be more specific, each of the second engaging parts 124 includes an extending groove 124a and a hook groove 124b that communicate with each other, while each of the first engaging parts 114 includes an extending section 114a and a hook section 114b connected with each other. Each extending section 114a is disposed in the corresponding extending groove 124a, and each hook section 114b is connected with the corresponding extending section 114a and engaged with the corresponding hook groove 124b, so as to fix the heat absorbing plates 110 side by side to the heat insulating plate 120. Furthermore, the extending sections 114a of two adjacent heat absorbing plates 110 are disposed in the same extending groove 124a, and the hook sections 114b connected with the extending sections 114a are hooked with the corresponding hook grooves 124b, so as to secure two adjacent heat absorbing plates 110 on the heat insulating plate 120.

In one embodiment, the solar thermal collector 100 further includes a filler 140 disposed in the hook groove 124b where the hook section 114b is engaged. In the present embodiments. A plurality of fillers 140 can be filled in the hook groove 124b and disposed between the hook sections 114b of any two adjacent heat absorbing plates 110 and the corresponding hook groove 124b to further secure the engagement between the two adjacent heat absorbing plates 110 and the heat insulating plate 120. In this embodiment, the filler 140 includes a curable adhesive, a sealant, or a wedge. Each wedge may be inserted between the hook sections 114b of any two adjacent heat absorbing plates 110 and the corresponding hook groove 124b to enhance the structural strength of the solar thermal collector 100 and a bonding force between the heat absorbing plates 110 and the heat insulating plate 120, thereby preventing overflow of the heat transfer medium under a working pressure.

It should be noted that this embodiment is merely an example of the invention, and this disclosure is not intended to limit the number of the heat absorbing plates 110 and the number of the heat insulating plates 120 of the solar thermal collector 100. In other embodiments of the invention, the solar thermal collector may include one heat absorbing plate 110 and one heat insulating plate 120, or multiple heat absorbing plates 110 and multiple heat insulating plates 120, as long as the first engaging parts 114 of the heat absorbing plate 110 can be securely engaged with the second engaging parts 124 of the heat insulating plate 120.

Moreover, in this embodiment, the first slab 112 and the second slab 122 are both curved slabs for increasing the strength against the working pressure of the heat transfer medium. Specifically, each first slab 112 and the corresponding second slab 122 are curved in the same direction. In other words, each first slab 112 and the corresponding second slab 122 may be curved slabs that are parallel to each other. Generally speaking, the curved slab withstands higher pressure than a planar slab because any pressure applied to any part of the curved slab can be evenly dispersed. In addition, each first slab 112 and the corresponding second slab 122 of this embodiment are curved in the same direction, which not only enhances the structural strength and pressure resistance of the solar thermal collector 100 but also reduces the overall thickness of the solar thermal collector 100. Meanwhile, the curve of the first slab 112 also increases a contact area between the first slab 112 and the heat transfer medium to enhance thermal transfer efficiency. The curve of the second slab 122 also improves the structural strength of the solar thermal collector 100 in the longitudinal direction D1.

Figure 3:
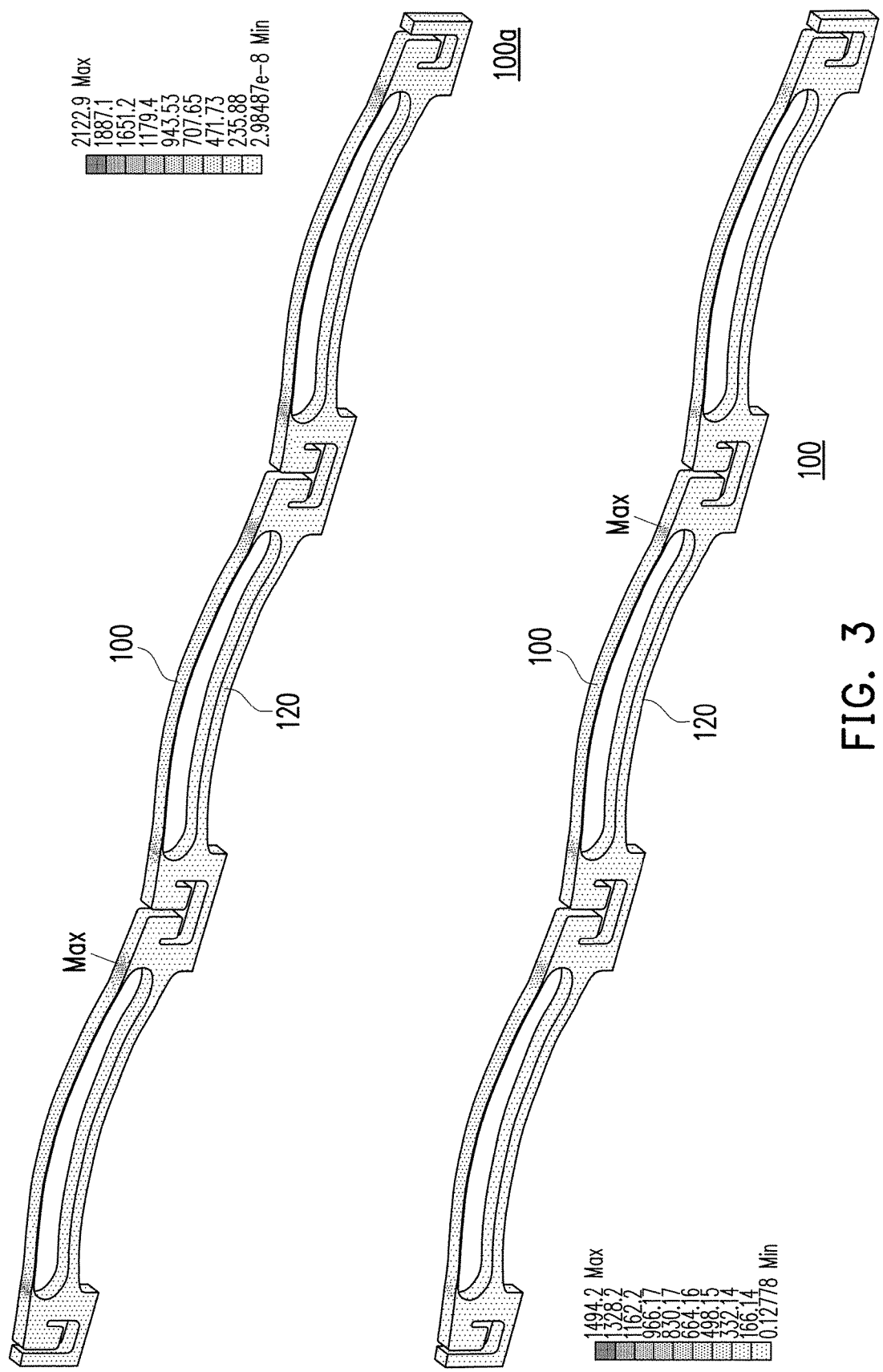
FIG. 3 is a schematic view showing a stress distribution of the solar thermal collector of FIG. 2 applied with internal pressure.

FIG. 3 is a schematic view showing a stress distribution of the solar thermal collector of FIG. 2 applied with internal pressure. FIG. 3 shows the stress distribution when an internal fluid pressure of 6 kgf/cm$^2$ is applied in the independent passage defined by the heat absorbing plate 110 and the heat insulating plate 120 of the solar thermal collector 100 of this embodiment. To be more specific, the upper part of FIG. 3 shows the stress distribution when an internal fluid pressure of 6 kg/cm$^2$ is applied to a solar thermal collector 100a with a heat insulating plate made of a thermoplastic resin (e.g., ABS resin); and the lower part of FIG. 3 shows the stress distribution when an internal fluid pressure of 6 kgf/cm$^2$ is applied to a solar thermal collector 100b with a heat insulating plate made of a composite material (e.g. FRP). It is proven by experiment that the solar thermal collector 100 of this embodiment withstands an internal fluid pressure of at least 6 kgf/cm$^2$, and under this pressure, displacement of the first slab 112 and the second slab 122 is minimal.

More specifically, the maximum displacement of the first slab 112 and the second slab 122 of the solar thermal collector 100a under the internal fluid pressure of 6 kgf/cm$^2$ is approximately between 0.28 mm and 2.59 mm, and the maximum stress the first slab 112 bears is about 2122 MPa, which is far less than the stress that causes permanent deformation of stainless steel. Similarly, the maximum displacement of the first slab 112 and the second slab 122 of the solar thermal collector 100b under the aforementioned pressure is approximately between 0.1 mm and 1.42 mm, and the maximum stress the first slab 112 bears is about 1494 MPa, which is also far less than the stress that causes permanent deformation of stainless steel. In addition, Young's modulus of the solar thermal collectors 100a and 100b of this embodiment are both greater than 20 GPa, which shows that the solar thermal collectors 100a and 100b have favorable structural strength in the longitudinal direction D1. Therefore, the solar thermal collector 100 of this embodiment has excellent structural strength and pressure resistance.

Figure 4:
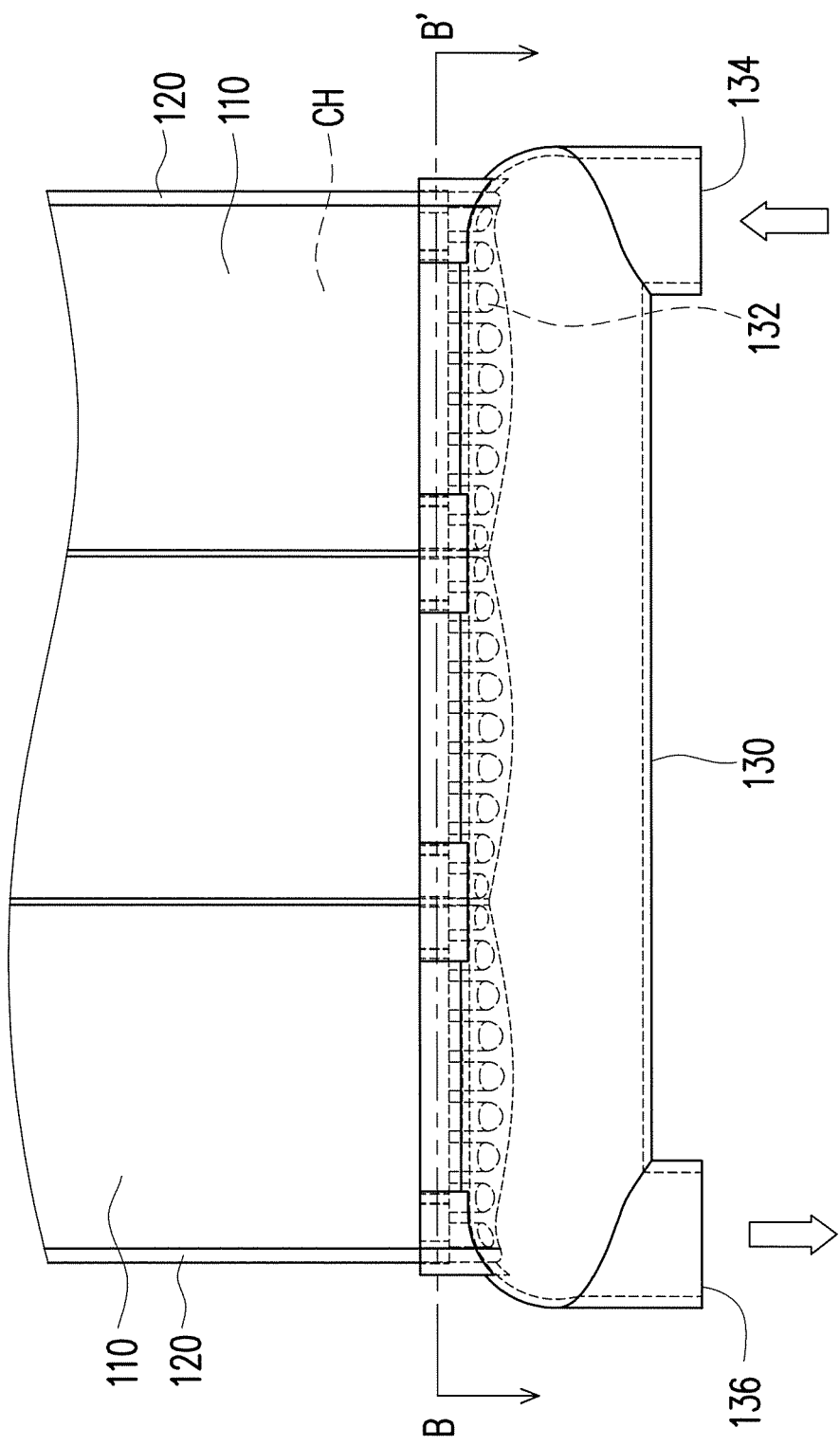
FIG. 4 is a schematic partially enlarged view of the solar thermal collector of FIG. 1.
Figure 5:
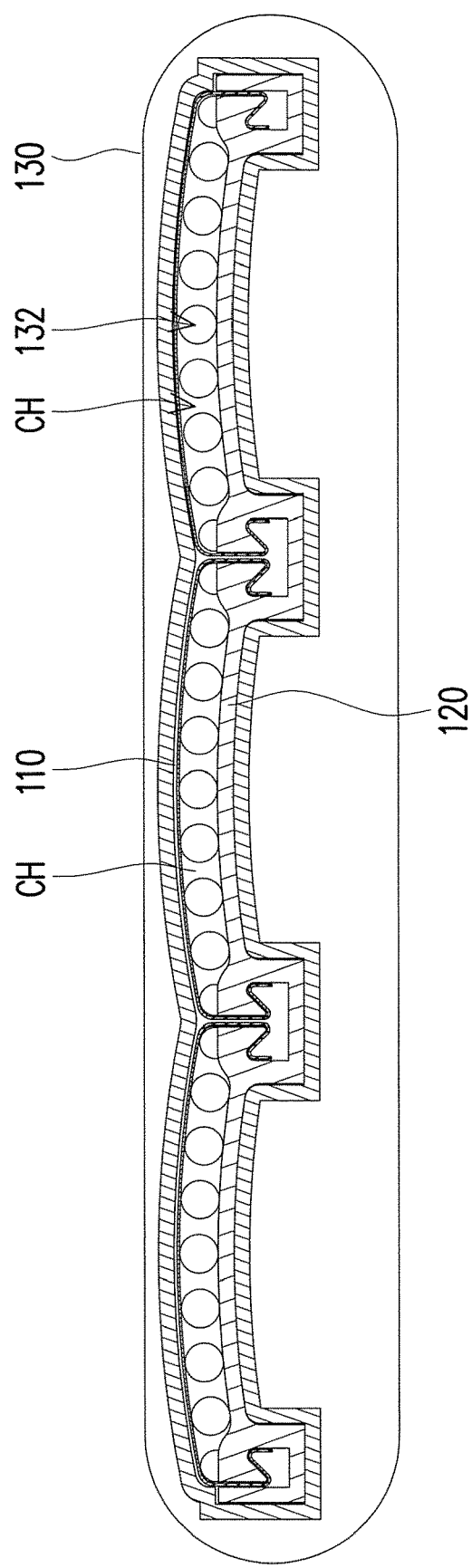
FIG. 5 is a schematic cross-sectional view of the solar thermal collector of FIG. 4 along the line B-B'.

FIG. 4 is a schematic partially enlarged view of the solar thermal collector of FIG. 1. FIG. 5 is a schematic cross-sectional view of the solar thermal collector of FIG. 4 along the line B-B'. With reference to FIG. 4 and FIG. 5, in this embodiment, the solar thermal collector 100 further includes a connecting pipe 130 that is connected to and covers a side of the heat absorbing plate 110 and the heat insulating plate 120. Specifically, the connecting pipe 130 includes a plurality of openings 132 connected to the edges of the heat collecting channel CH to allow the heat transfer medium to flow in and out of the heat collecting channels CH through the connecting pipe. The solar thermal collector 100 of this embodiment is applicable to a solar water heater, for example, for converting solar radiation energy absorbed by the solar thermal collector 100 to thermal energy for heating water. The connecting pipe 130 includes an inlet 134 and an outlet 136. The heat transfer medium flows into the heat collecting channel CH through the inlet 134 of the connecting pipe 130, as indicated by the arrow in FIG. 4, and then flows out of the heat collecting channel CH after absorbing thermal energy and flows out of the solar thermal collector 100 through the outlet 136 of the connecting pipe 130.

It should be noted that the configuration of the connecting pipe 130 is not limited to the above. The connecting pipe 130 may be disposed on two opposite sides of the heat absorbing plate 110 and the heat insulating plate 120, for example, to respectively communicate with two opposite ends of the heat collecting channel CH. The heat transfer medium may flow into the connecting pipe 130 at one end of the heat collecting channel CH and flow out of the solar thermal collector 100 from the connecting pipe 130 at the other end of the heat collecting channel CH after absorbing thermal energy. This disclosure is not intended to limit the number and configuration of the connecting pipe 130 of the invention.

Figure 6:
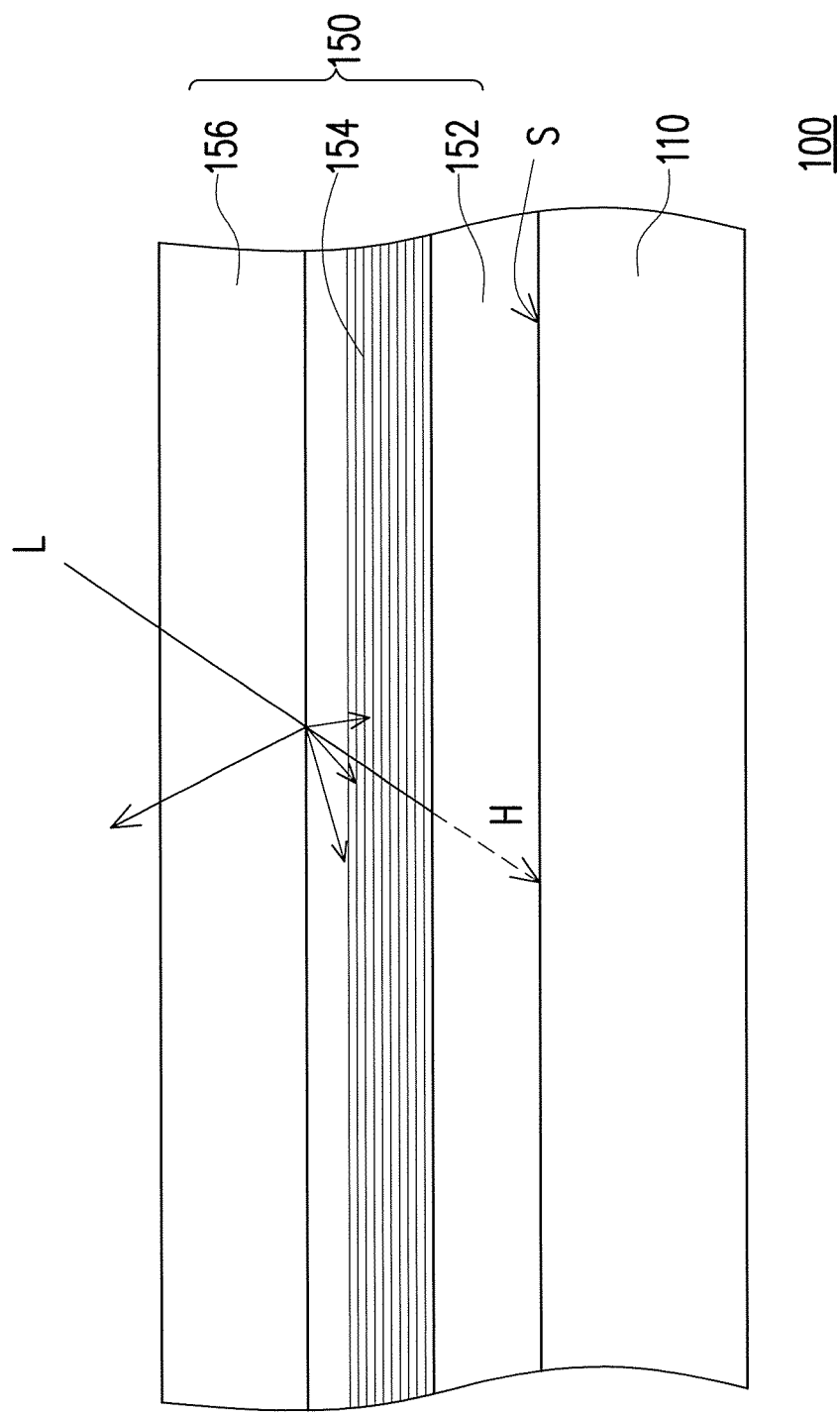
FIG. 6 is a schematic partially enlarged cross-sectional view of a heat absorbing plate according to an embodiment of the invention.

FIG. 6 is a schematic partially enlarged cross-sectional view of the heat absorbing plate according to an embodiment of the invention. With reference to FIG. 6, in this embodiment, the solar thermal collector 100 further includes a solar selective absorption coating 150 disposed to cover a solar-receiving surface S of the heat absorbing plate 110. The solar selective absorption coating 150 includes a damping layer 152, an absorption layer 154, and an anti-reflective layer 156 disposed sequentially to cover the solar-receiving surface S. That is to say, the damping layer 152 covers the solar-receiving surface S, the absorption layer 154 covers the damping layer 152, and the anti-reflective layer 156 covers the absorption layer 154. The damping layer 152 is formed on the solar-receiving surface S by sputtering, for example. A material of the damping layer 152 includes metal nitride, metal carbide, or metal carbon nitride. More specifically, the material of the damping layer 152 is selected from one or any combination of ZrN, TiN, TiAlN, CrN, TiC, CrC, TiCN, TiAlCN, ZrCN, and CrCN, for example.

In addition, the absorption layer 154 may also be formed on the damping layer 154 by sputtering. A material of the absorption layer 154 includes metal oxide and metal nitride, metal carbide, or metal carbon nitride. In other words, the material of the absorption layer 154 may be obtained by mixing the material of the damping layer 152 with metal oxide. The anti-reflective layer 156 may be formed on the absorption layer 154 by deposition. A material of the anti-reflective layer 156 includes silicon oxide or silicon nitride. However, it should be noted that the aforementioned materials of the damping layer 152, the absorption layer 154, and the anti-reflective layer 156 are merely examples and should not be construed as a limitation to the invention. By depositing the solar selective absorption coating 150 on the solar-receiving surface S, sunlight enters the absorption layer 154 and the damping layer 152 through the anti-reflective layer 156 and radiation energy of the sunlight is converted into thermal energy by the absorption layer 154. The thermal energy is then transferred to the heat transfer medium through the heat absorbing plate 110.

Figure 7:
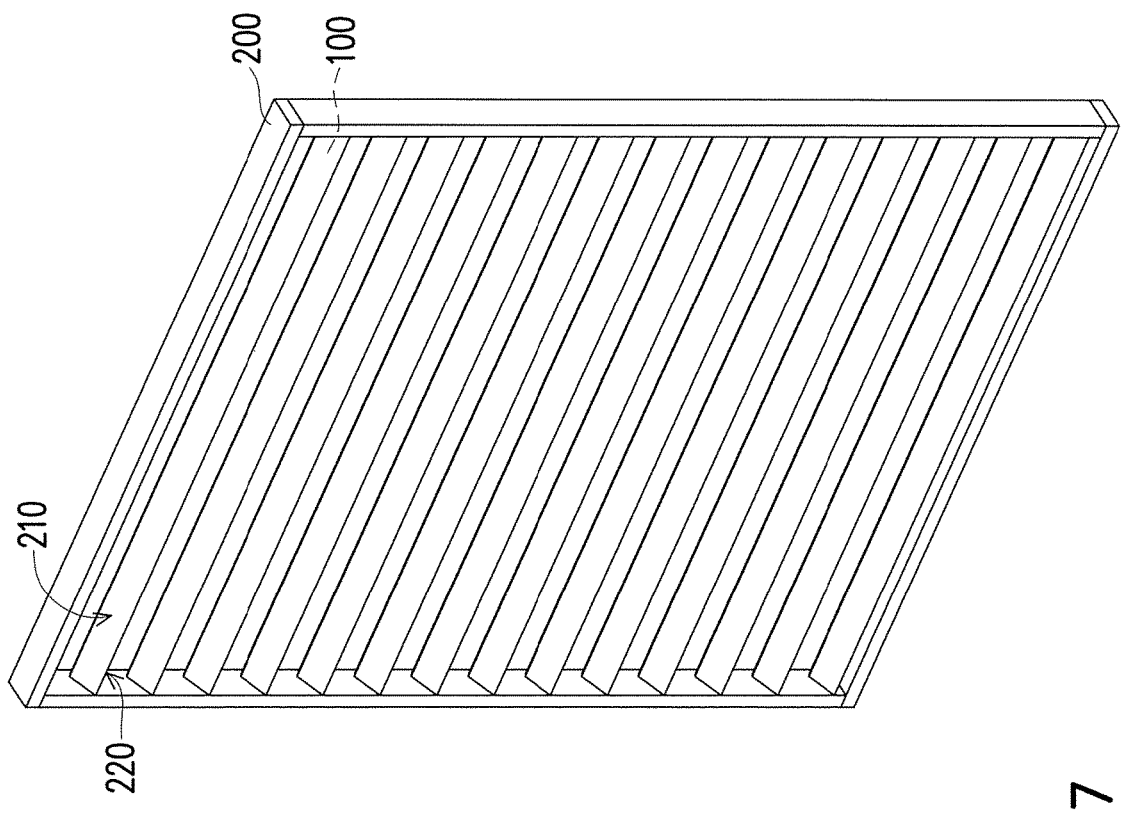
FIG. 7 is a schematic view of a building accessory structure according to an embodiment of the invention.

FIG. 7 is a schematic view of a building accessory structure according to an embodiment of the invention. With reference to FIG. 1 and FIG. 7, in this embodiment, a building accessory structure 10 is applicable to an external area of a building. The building accessory structure 10 includes at least one frame 200 and a plurality of solar thermal collectors 100 shown in FIG. 1 to FIG. 6. The frame 200 is configured to hold the solar thermal collectors 100, which are disposed in parallel to each other in the frame 200. The frame 200 includes at least one light-transmissive front cover 210, which is placed on the front side facing the heat absorbing plates 110 of the solar thermal collector 100 shown in FIG. 1. The frame 200 also includes at least one light-transmissive back cover 220, which is placed on the back side facing the heat insulating plates 120 of the solar thermal collector 100 shown in FIG. 1. It should be noted that this embodiment is given as an example of the invention. This disclosure is not intended to limit the number or the dimensions of the solar thermal collector 100 can be implemented in frame 200.

Figure 8A:
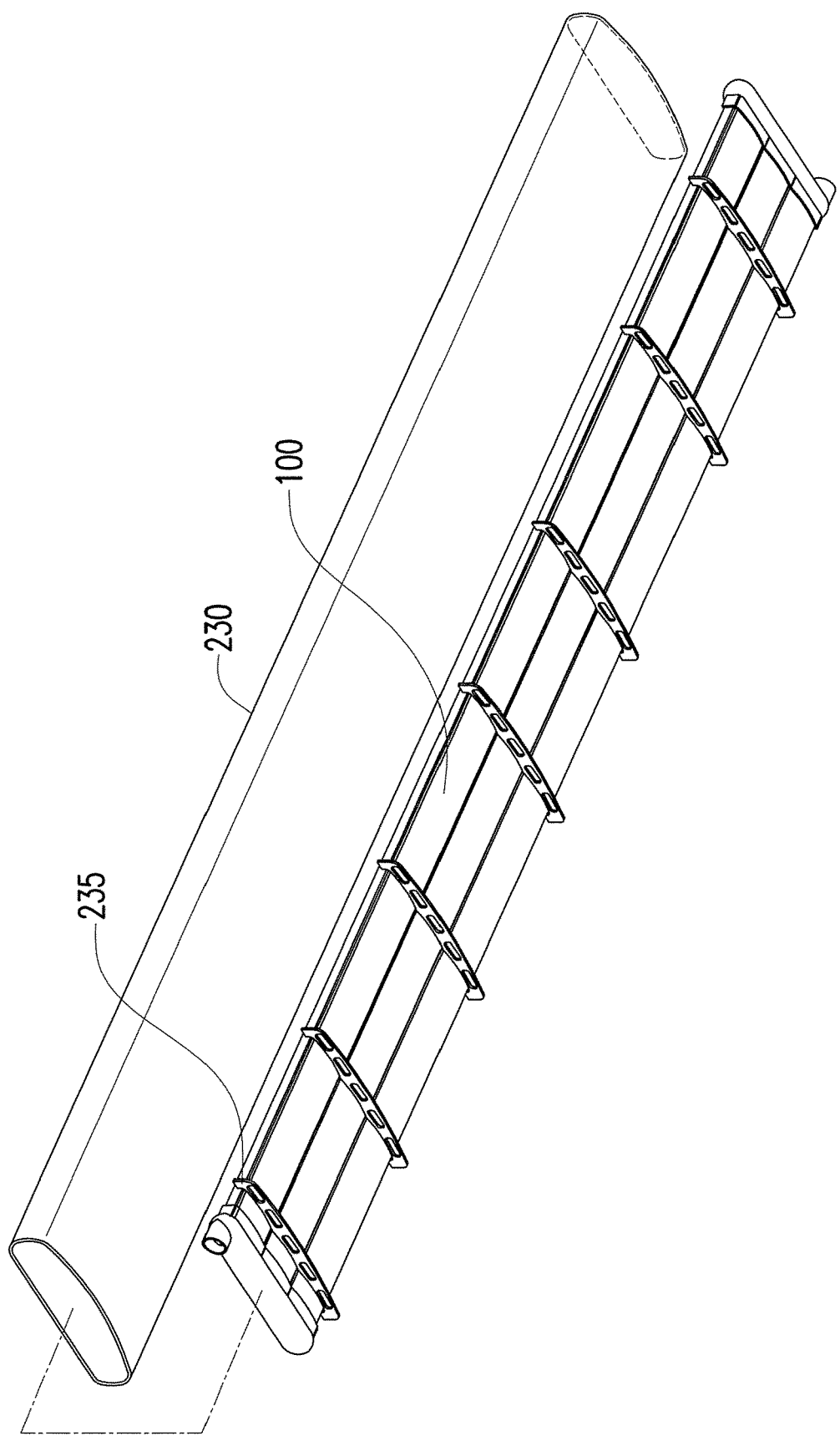
Figure 8B:
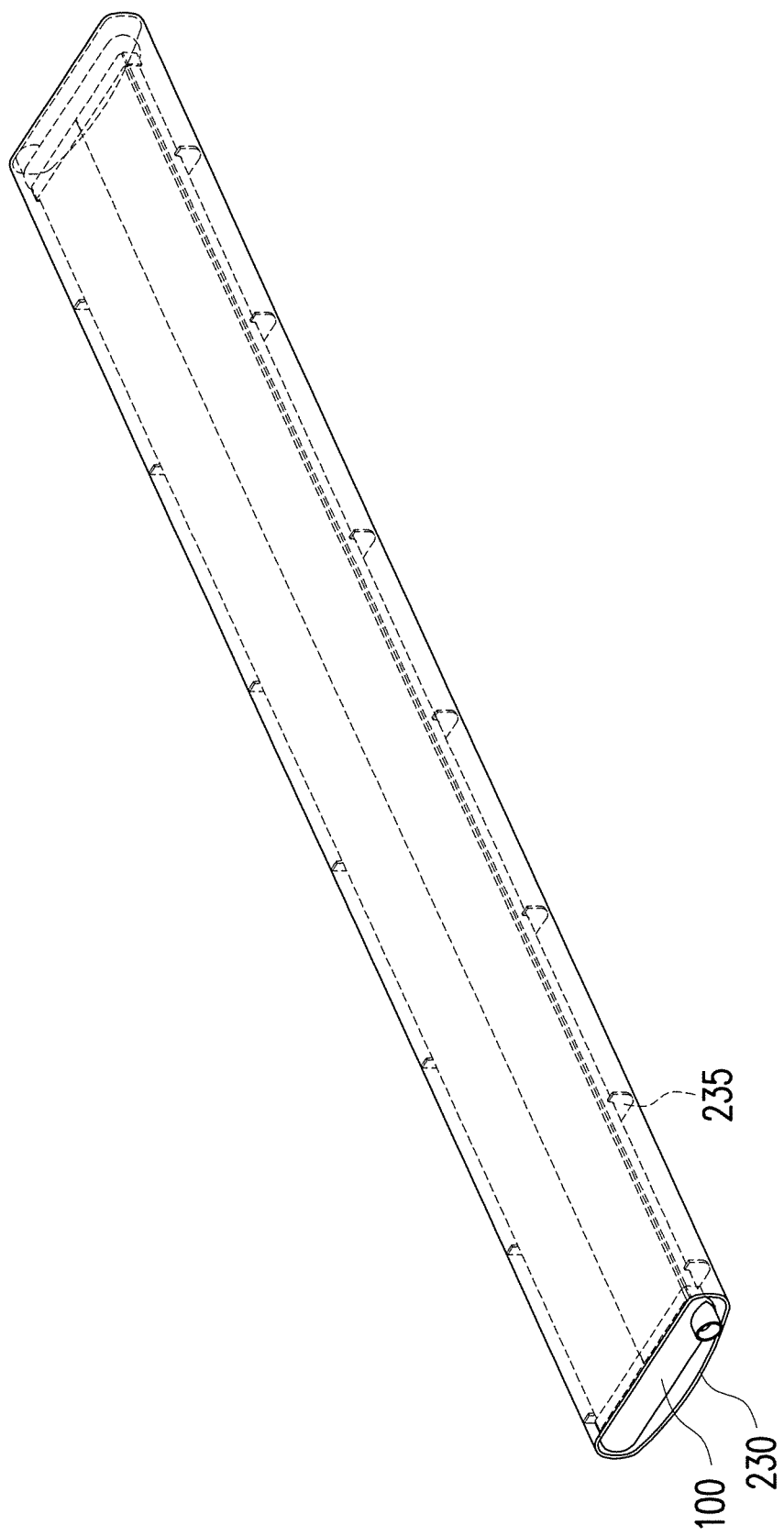

FIG. 8A to FIG. 8C are schematic exploded views and assembled view of a light-transmissive sleeve tube and a solar thermal collector according to an embodiment of the invention. With reference to FIG. 8A to FIG. 8C, in this embodiment, the frame 200 includes at least one light-transmissive sleeve tube 230 to hold the solar thermal collector 100 shown in FIG. 1 to FIG. 6, and the light-transmissive sleeve tube 230 is made in one piece. The light-transmissive sleeve tube 230 defines a receiving space. The solar thermal collector 100 is assembled and disposed in the receiving space. In the present embodiment, the light-transmissive sleeve tube 230 is made of non-glass materials. To be more specific, the light-transmissive sleeve tube 230 is made of plastic materials. The reinforcing fins 235 are disposed between the heat insulating plate 120 and the light-transmissive sleeve tube 230 for supporting the structure. In this embodiment, a longitudinal length L1 of the solar thermal collector 100 is about 245 cm, a transverse width W1 is about 20 cm, and a height H1 is about 4.5 cm. Moreover, a transverse width of the assembly of the heat absorbing plate 110 and the heat insulating plate 120 is about 18 cm. It should be noted that this embodiment is given as an example of the invention. This disclosure is not intended to limit the dimensions of the solar thermal collector 100.

Figure 9:
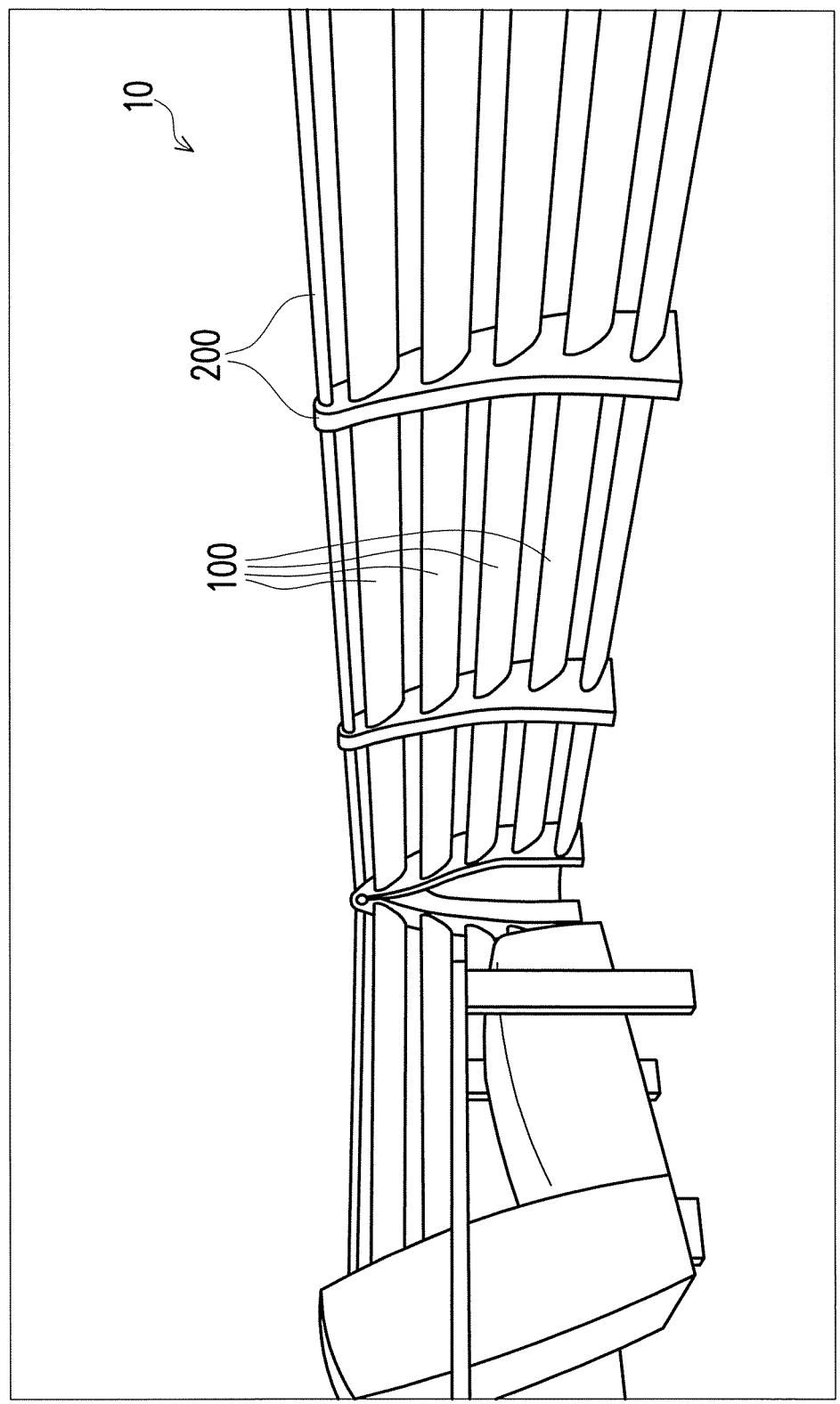
FIG. 9 to FIG. 11 are schematic views showing uses of a building accessory structure according to different embodiments of the invention.
Figure 10:
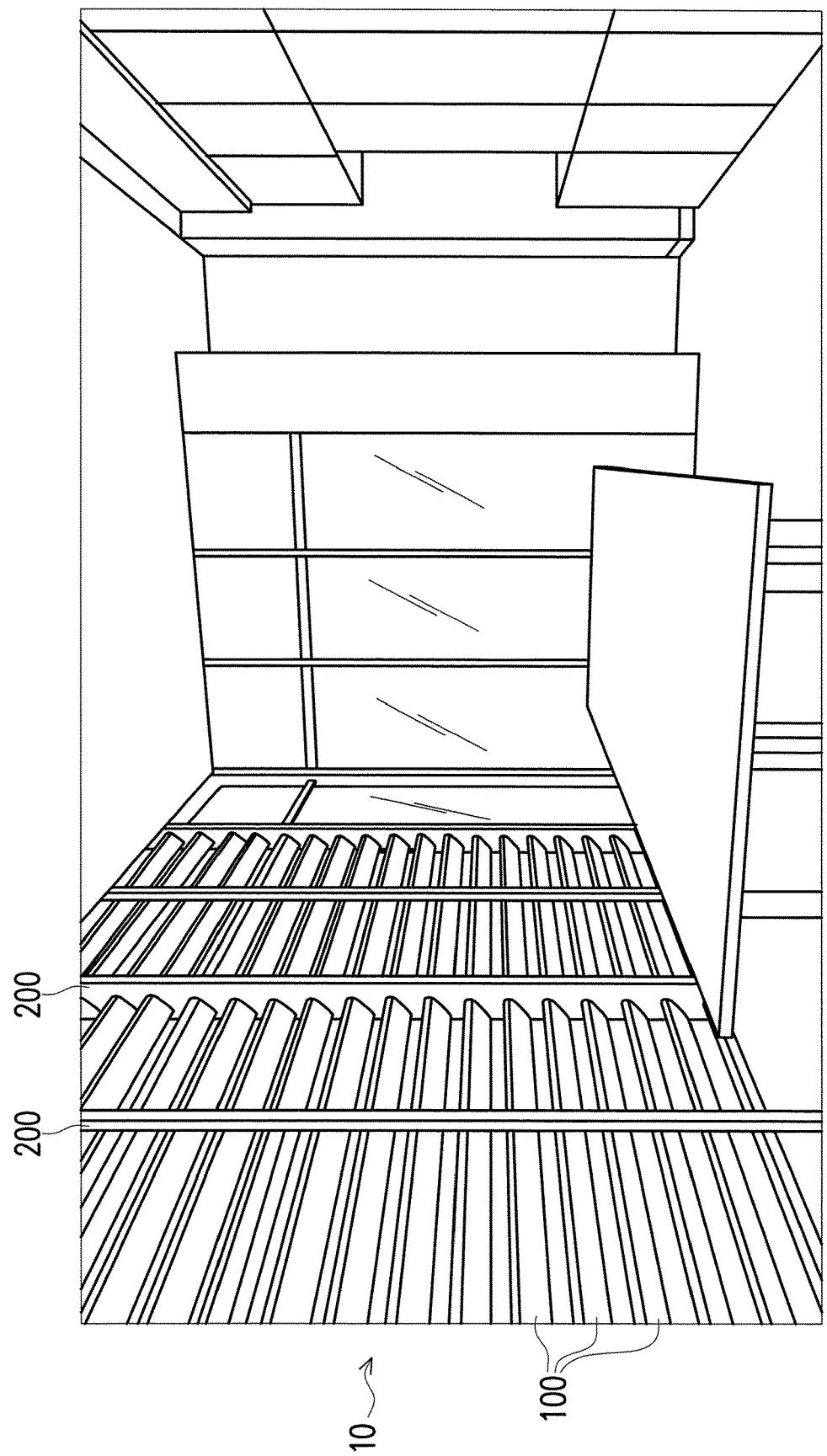
Figure 11:
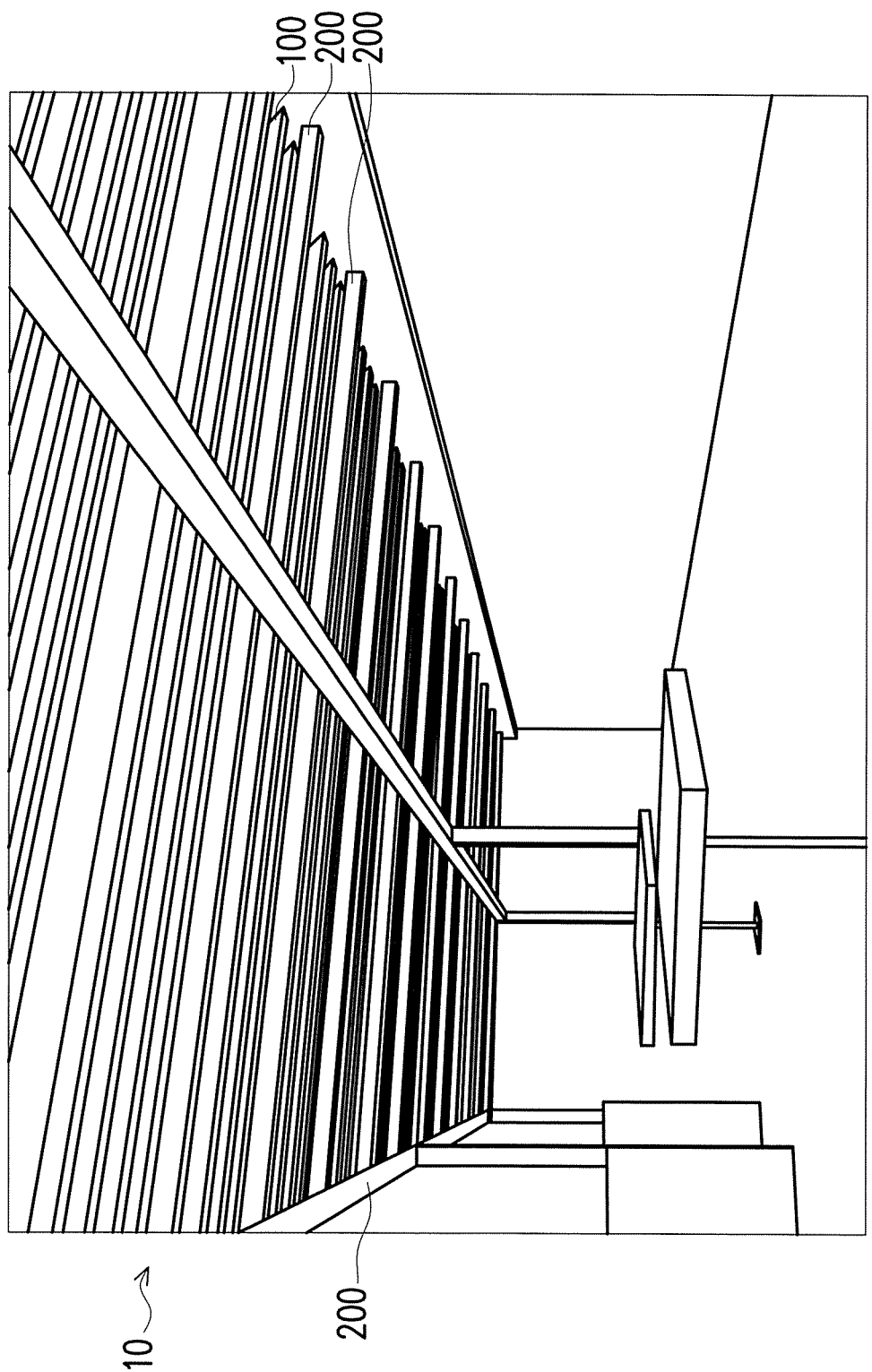

FIG. 9 to FIG. 11 are schematic views showing uses of a building accessory structure according to different embodiments of the invention. With reference to FIG. 9, the aforementioned solar thermal collector 100 may be modularized as a building accessory structure to be disposed on an external area of the building for absorbing solar radiation energy and converting the solar radiation energy into thermal energy for heating water or providing heating for the building. For example, a building accessory structure 10 includes the above mentioned frame 200 and a plurality of the above mentioned solar thermal collectors 100, as shown in FIG. 9. The frame 200 is configured to surround and define the receiving space, and the solar thermal collectors 100 are disposed in the receiving space of the fame 200.

More specifically, the solar thermal collectors 100 may be disposed in parallel to each other in the frame 200, for example, to form a discontinuous wall for increasing the solar absorbing area of the building accessory structure 10. The building accessory structure 10 may be disposed on the external area of the building that is easily exposed to sunlight, such that the building accessory structure 10 not only serves as a shading structure but also absorbs the solar radiation energy to be converted into thermal energy for heating water or providing heating for the building.

With reference to FIG. 9, in this embodiment, the external area for disposing the building accessory structure 10 may be a balcony, a patio or a terrace of the building and the building accessory structure 10 may be a railing or barrier to be applied to the balcony, patio or terrace. To be more specific, the building accessory structure 10 may be disposed on an outer edge of the balcony, patio or terrace to serve as fences. Further, with reference to FIG. 10 and FIG. 11, in these embodiments, the external area for disposing the building accessory structure 10 may be a rooftop, a window, a patio, or a terrace of the building or an open space adjacent to the building (e.g., front yard, backyard, or arcade of the building). The building accessory structure 10 may be disposed on the aforementioned external area to serve as a shading structure or a covering structure of the building. For example, the building accessory structure 10 may serve as blinds for keeping out sunlight when disposed on the window of the building. Moreover, the building accessory structure 10 may serve as sunshades when disposed at the balcony, patio, front yard, or backyard of the building. Thus, the building accessory structure 10, used as the external shading structure, reduces the heat of solar radiation and sunlight that enter the building through the walls, or provides shading for the open space adjacent to the building. What is more, the building accessory structure 10 absorbs the solar energy received by the building and the surroundings for cooling the building. In comparison with the conventional external shading structure, the building accessory structure 10 of the invention achieves more favorable cooling effects for the building. Furthermore, the building accessory structure 10 converts the heat of solar radiation into thermal energy for heating water for daily use or providing heating for the building.

To sum up, the heat absorbing plate and the heat insulating plate of the solar thermal collector of the invention are engaged with each other and have the gap in between to define the heat collecting channel allowing the heat transfer medium to flow through. In addition, the heat conductivity of the heat absorbing plate is substantially 30 times or more greater than the heat conductivity of the heat insulating plate. Thus, the thermal energy of sunlight is efficiently transferred to the heat transfer medium in the heat collecting channel through the heat absorbing plate with high heat conductivity while the heat insulating plate providing favorable thermal insulation effectively prevents loss of the thermal energy. Moreover, the solar thermal collector of the invention is light in weight, strong in structural strength and low in heat loss, and therefore the size and thickness of the heat insulating plate and the casing are effectively reduced without sacrificing the structural strength and the triennial insulation performance. Hence, the solar thermal collector of the invention not only achieves favorable efficiency in collection of solar energy but also has smaller size and overall thickness. Consequently, the wind resistance of the solar thermal collector is reduced.

Furthermore, the solar thermal collector of the disclosure may be modularized as the building accessory structure. That is, a plurality of solar thermal collectors are disposed in the frame to modularize the solar thermal collectors and increase the efficiency of collection of solar energy. The building accessory structure of the disclosure may be disposed on the external area of the building, for example, for absorbing the solar energy received by the building and converting the solar energy into thermal energy for use of the building. Thus, the invention increases the applicability and design flexibility of the solar thermal collector in building integration.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A building accessory structure applicable to an external area of a building, the building accessory structure comprises:
   a plurality of the solar thermal collectors, each of the solar thermal collectors comprising:
      at least one heat absorbing plate, comprising at least one first slab and a plurality of first engaging parts connected with the first slab; and
      at least one heat insulating plate, comprising:
         at least one second slab; and
         a plurality of second engaging parts connected with the second slab, wherein each of the second engaging parts comprises an extending groove and a hook groove, and each of the first engaging parts comprises an extending section and a hook section, each extending section is engaged with the corresponding extending groove, and each hook section is engaged with the corresponding hook groove in order to attach the heat absorbing plates to the heat insulating plates, and a gap is maintained between the first slab and the second slab to form a heat collecting channel, that allows a heat transfer medium to flow through, and the heat conductivity of the heat absorbing plate is at least 30 times greater than the heat conductivity of the heat insulating plate; and
   at least one frame configured to hold the solar thermal collectors, which are disposed in parallel to each other in the frame.

2. The building accessory structure according to claim 1, wherein the frame comprises:
   at least one light-transmissive front cover disposed on the side facing the heat absorbing plates; and
   at least one light-transmissive back cover disposed on the side facing the heat insulating plates.

3. The building accessory structure according to claim 1, wherein the frame comprises at least one light-transmissive sleeve tube to hold the solar thermal collector, and the light-transmissive sleeve tube is made in one piece.

4. The building accessory structure according to claim 3, wherein the light-transmissive sleeve tube is made of non-glass materials.

5. The building accessory structure according to claim 3, wherein the light-transmissive sleeve tube is made of plastic materials.

6. The building accessory structure according to claim 1, wherein the external area comprises a balcony or a terrace of the building.

7. The building accessory structure according to claim 6, adapted to be a railing or barrier to be applied to the balcony or the terrace.

8. The building accessory structure according to claim 1, wherein the external area comprises a rooftop, a window, a patio, or an open space adjacent to the building.

9. The building accessory structure according to claim 8, adapted to be a shading structure or a covering structure to be applied to the rooftop, the window, the patio, or the open space adjacent to the building.

10. The building accessory structure according to claim 1, wherein each of the solar thermal collectors further comprises a plurality of connecting pipes, which are connected to the edges of the heat collecting channel.

11. The building accessory structure according to claim 10, wherein each of the connecting pipes further comprises a plurality of openings to allow the heat transfer fluid to flow in and out of the heat collecting channel through the connecting pipe.

12. The building accessory structure according to claim 1, wherein each of the hook grooves further comprises a filler disposed in the hook groove where the hook section is engaged.

13. The building accessory structure according to claim 12, wherein each of the fillers comprises a wedge, a curable adhesive, or a sealant.

14. The building accessory structure according to claim 1, wherein each of the first slabs and each of the second slabs are curved slabs, and each of the first slabs and the corresponding second slab are curved in the same direction.

15. The building accessory structure according to claim 1, wherein each of the solar thermal collectors further comprises a solar selective absorption coating that covers a solar-receiving surface of the heat absorbing plate.

* * * * *